Patented May 15, 1934

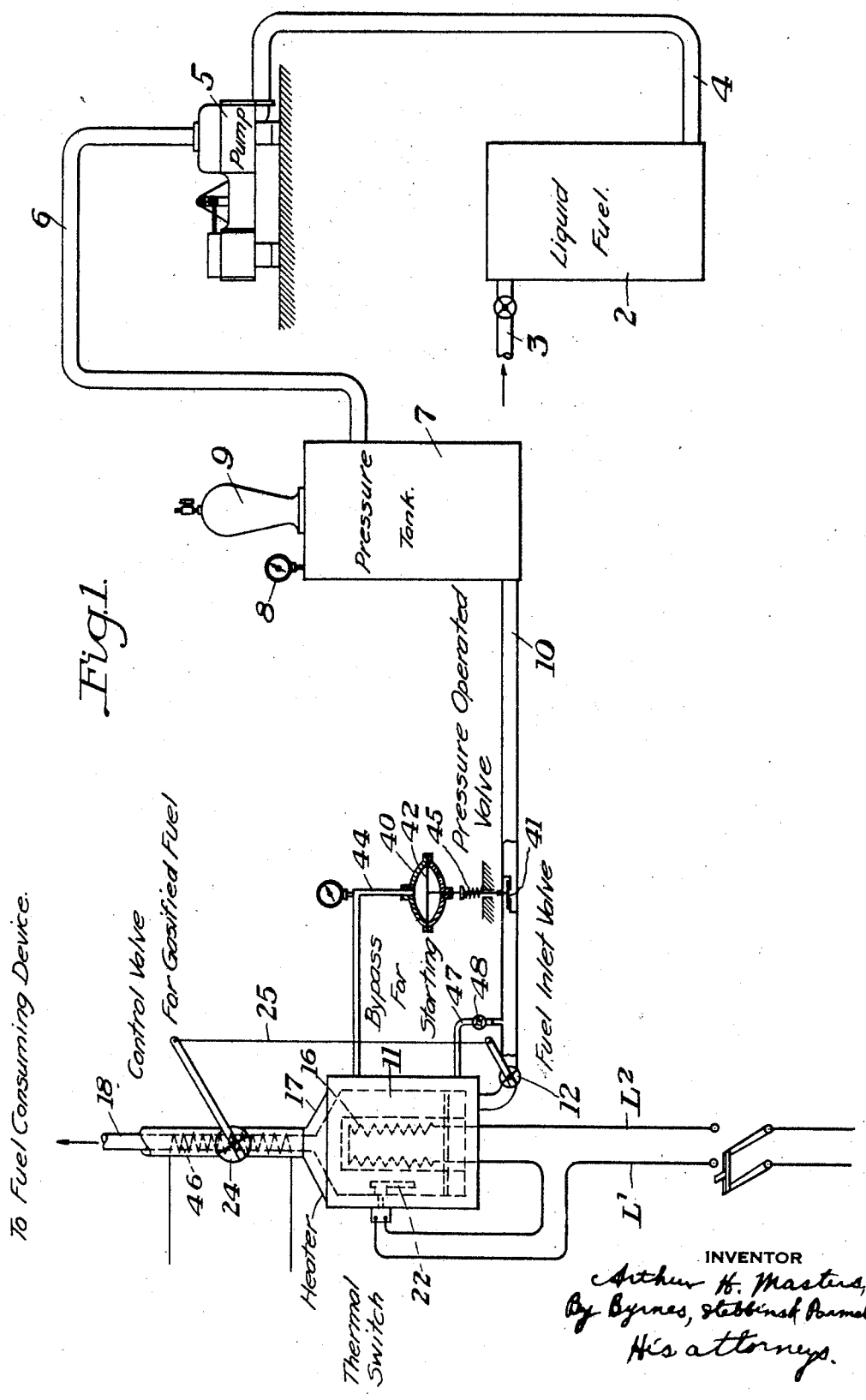

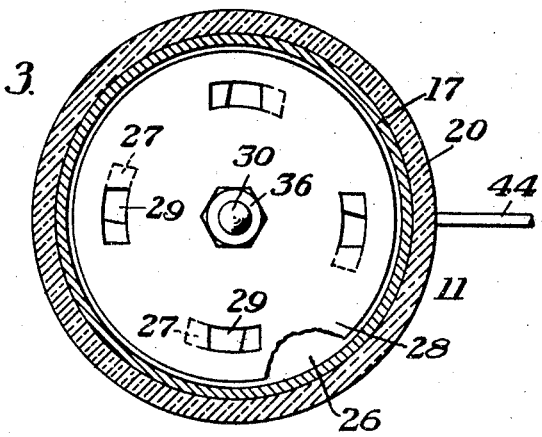
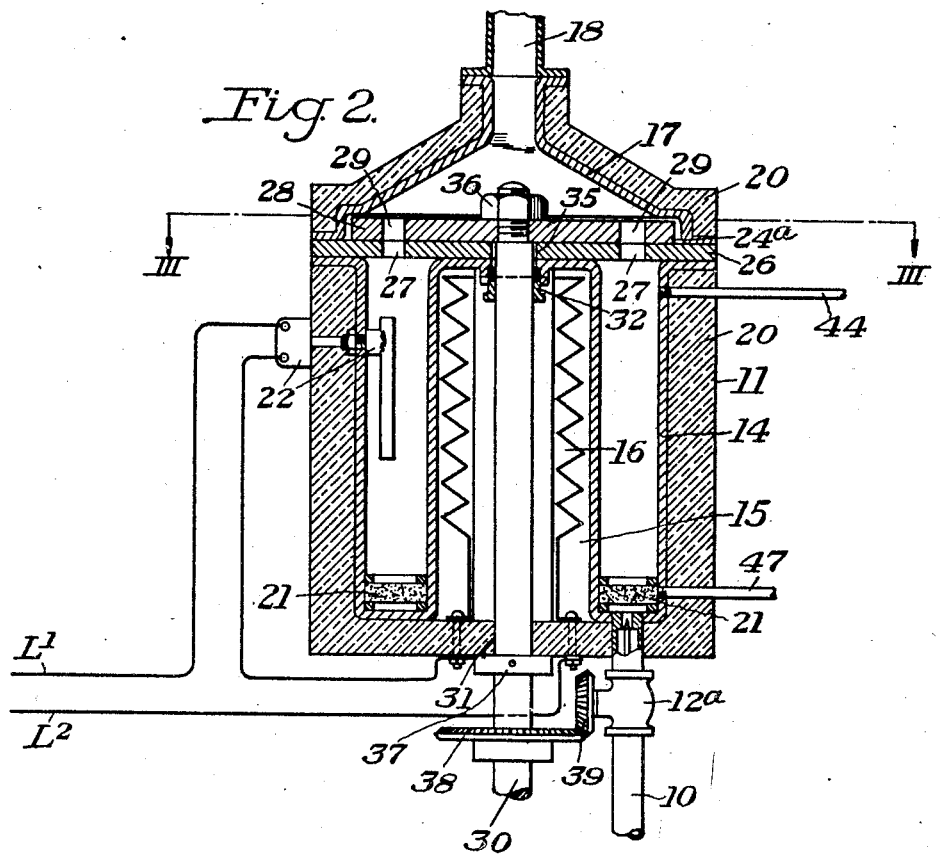

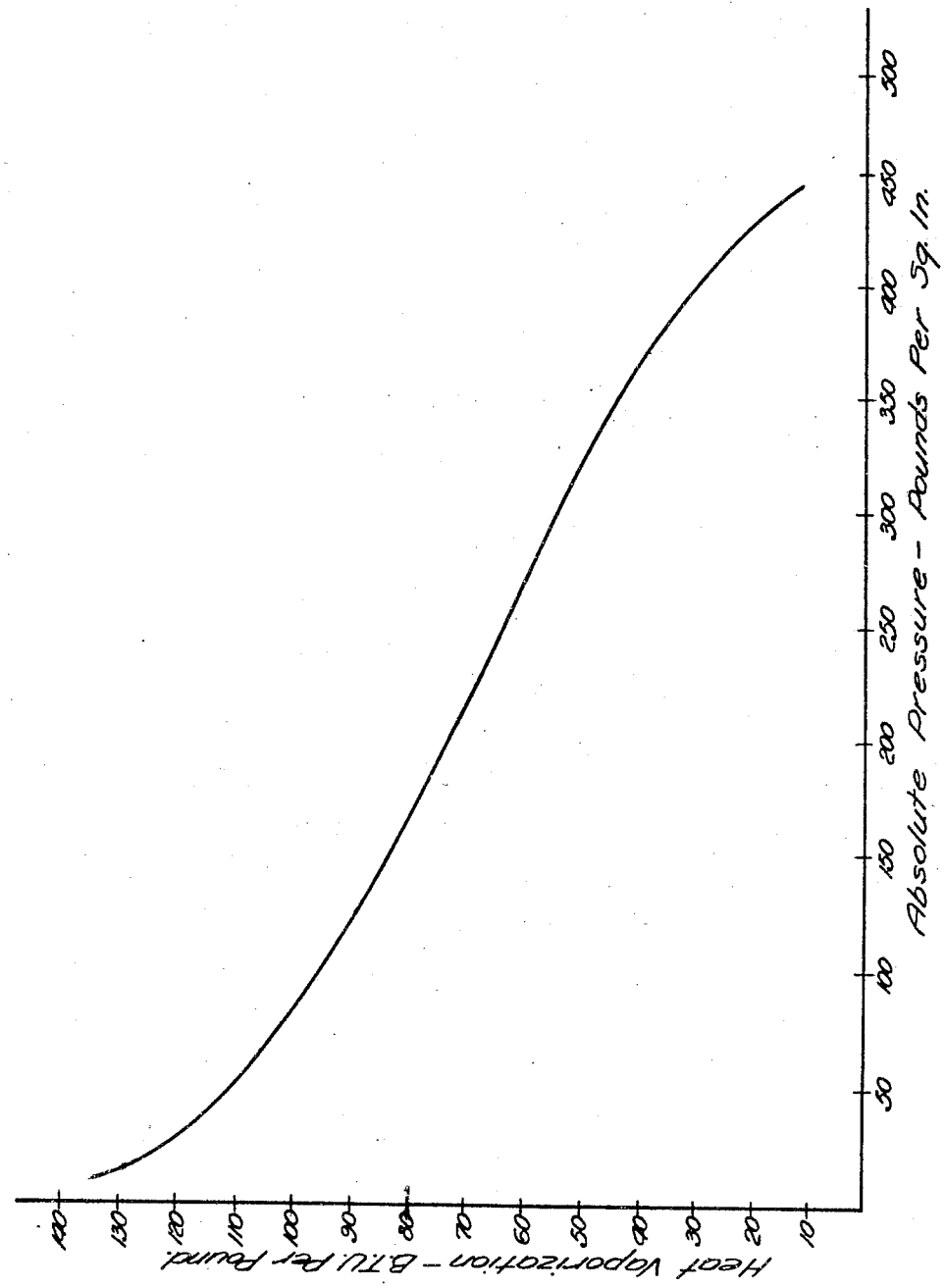

1,959,031

UNITED STATES PATENT OFFICE 1,959,031

METHOD OF VAPORIZING LIQUID FUEL

Arthur H. Masters, Pittsburgh, Pa.

Application September 18, 1928, Serial No. 306,686

6 Claims. (Cl. 158—117.5)

My invention relates to the vaporization of liquids and may be employed in connection with many types of fuel consuming devices. Among the uses to which the invention may be put are those of supplying fuel to internal combustion engines and heaters, and supplying vaporized liquids to apparatus used in connection with different types of industrial and chemical processes.

In supplying liquid fuel to internal combustion engines and the like, it has heretofore been proposed to pass the liquid through devices for mixing the fuel with air to produce a combustible vapor. In such devices, however, the liquid fuel is not completely mixed but often passes through the mixing device or carburetor in the form of drops. The presence of such drops in internal combustion engines and in other types of apparatus requiring fuel in a vapor state reduces the efficiency of such an engine or other device in accordance with engineering principles, a discussion of which is outside the scope of this application.

In an effort to supply liquid fuel in vapor form, efforts have heretofore been made to heat the fuel at substantially atmospheric pressure and utilize the vapors thereby obtained. This method of obtaining vapor has not proven satisfactory for several reasons. When heat is applied to the fuel at substantially atmospheric pressures, there is a tendency for the lighter vapors to be driven off and for the heavier parts of the liquid to be deposited on the walls of the container. The continued application of heat to the deposit of the heavier components of the fuel results in a coking condition along the walls of the receptacle in which the heating is taking place. The deposit of coke lowers the thermal efficiency of the heating apparatus, thereby necessitating the application of considerable heat for continuing the vaporizing operation. The fuel value of the deposited material is also lost, thereby reducing the thermal value of the vapor obtained from a definite quantity of fuel.

Difficulty is also experienced in obtaining a sufficient volumetric efficiency of the resultant vapor. By volumetric efficiency is meant the amount of potential thermal energy contained in a given volume of vapor. It is a well-known fact that certain mixtures of vapor at high temperatures do not contain enough fuel, in vapor form, to perform the work required of the apparatus being supplied with fuel. This condition is frequently referred to as "too lean a mixture."

This condition may be remedied by reducing the temperature of the vapor mixture. However, any reduction in the temperature of the vapor mixture supplied to an internal combustion engine or other device must be made up for, by raising the temperature of the vapor at the time that it is burnt or otherwise utilized.

I provide for supplying vapor to a consuming device, such as an internal combustion engine, heater or the like, in a dry state and under such pressure that the volumetric efficiency of the vapor is suitable for the purposes of the fuel consuming apparatus. For providing such a vapor, liquid fuel is forced under pressure through means for mechanically breaking up the liquid. The mechanically broken up liquid is fed into a heating chamber at such a rate that there is no deposit of liquid fuel. A deposit of liquid fuel would tend to coke the heating chamber as heretofore described.

Heat is supplied to the chamber by an internally mounted heating appliance, such as an electric heater. The chamber is provided with heavy thermal insulation for conserving heat. The mechanically sub-divided fuel injected into the chamber at such temperature and pressure vaporizes with a material increase in its volume. However, by reason of the pressure maintained on the vapor, the volumetric efficiency of the gas remains high and the temperature of the vapor insures that it is in a dry condition. Provision is also made for controlling the heating unit in accordance with the demands on the apparatus, together with means for initiating the vaporization of the fuel.

The accompanying drawings illustrate certain present preferred embodiments of the invention, in which Figure 1 is a schematic view in elevation with parts in section showing a complete system for transforming liquid fuel to vaporized fuel;

Figure 2 is a vertical section through a heater proper;

Figure 3 is a horizontal section taken on the line III—III of Figure 2; and

Figure 4 is a curve showing the relation between the heat of vaporization and the absolute pressure in pounds per square inch for gasoline.

Referring to Figure 1, there is shown a liquid fuel tank 2 having an inlet 3 and an outlet 4. The outlet 4 is connected to a pump 5, which supplies liquid fuel under pressure through a conduit 6 to a pressure tank 7. The pressure tank is provided with a gauge 8 and a bell 9 for equalizing the pressure.

The pressure tank 7 is connected through a conduit 10 to a heater 11. The conduit 10 contains a fuel inlet valve 12 arranged for manual or automatic operation, depending upon the quantity of fuel required.

Referring to Figures 2 and 3, the heater 11 comprises a thin internal metallic casing 14 defining a heating chamber. The casing 14 is provided with a centrally disposed opening 15 in which a heater 16 is mounted. The upper end of the heating chamber is closed by a cap 17 connected to an outlet conduit 18 leading to any fuel consuming device, such as an internal combustion engine, heater stove and/or apparatus used in connection with any desired mechanical or chemical process. It is to be understood that the present invention relates broadly to the vaporization of liquid fuel as distinguished from the application of vaporized fuel to any particular use.

The heater 11 is provided with an outer heat insulating lining 20 that extends around the outer surface of the casing 14 and over the cap 17. The presence of the heat insulation insures the conservation of the heat liberated by the heater 16 and the utilization of that heat for vaporizing the fuel, as hereinafter more fully described, and permits radiation and loss of heat. As the temperature in the chamber must be maintained at a sufficient value to insure the complete volatilization of all the liquid fuel supplied thereto, and as the volume of fuel supplied to the heating chamber per unit of time varies, as hereinafter described, the successful vaporization of the fuel renders it advisable that the heating unit be mounted within the heating chamber so that heat liberated therefrom is quickly transferred to the liquid. The foregoing conditions render the use of externally mounted burners inadvisable.

Another reason for using an internal heater is that the temperature of the entire chamber should be maintained substantially constant to prevent the occurrence of zones of different temperature therein. This condition requires external heat insulation over substantially the entire outer surface of the heating chamber.

Liquid fuel such as gasoline or other suitable fuel is supplied to the heating chamber through the conduit 10 and valve 12. The fluid is forced through a porous diaphragm 21 disposed at substantially the bottom of the heating chamber for mechanically breaking it up into very minute particles. To prevent the accumulation of a body of liquid, from which distillation might take place, at the bottom of the heating chamber, the diaphragm is disposed at substantially the bottom of the chamber and the rate at which fuel is forced through it is controlled so that there is never more liquid supplied to the chamber than can be converted into a vapor by the heat available. This construction eliminates coking in the heating chamber and insures that the heavier portions of the fuel as well as the lighter distillates are converted into a vapor state, thereby insuring that substantially all of the fuel supplied to the chamber is made available for consumption. Where the heavier components of liquid fuel are allowed to accumulate and coke on the walls of a heating chamber, their value as fuel is lost, thereby decreasing the over-all efficiency of the apparatus being supplied with fuel.

The fuel upon being converted from a liquid to a vapor by absorbing heat, increases in volume. The pressure in the heating chamber is maintained at least above atmospheric pressure. For some purposes the pressures may run as high as 650 pounds gauge pressure. In general, the operating range of pressure is from 110 to 650 pounds per square inch, although for other purposes a pressure but slightly in excess of atmospheric pressure may be utilized. The foregoing values are given by way of illustration and not by way of limitation, as the pressure in the heating chamber may be varied in accordance with the service demanded of the heater.

As the vapor is under pressure, the quantity of fuel available per unit volume of vapor is higher than where fuel is suspended in air at atmospheric pressure. This condition is referred to as the volumetric efficiency of the fuel. A heated vapor is apt to have a volumetric efficiency so low that it is not useful for fuel for many purposes, particularly for internal combustion engines. By converting the fuel from a liquid to a vapor under heat and pressure, it is possible to increase the volumetric efficiency of the vapor materially, and, at the same time, retain the vapor in a dry condition.

The heater 16 is illustrated in the form of an electrical resistor disposed in the opening 15 and disposed above the top of the diaphragm 21. Electrical energy is supplied to the heater 16 from conductors $L^1$ and $L^2$ of a power circuit. The conductor $L^1$ is connected to a regulator 22 extending into the heating chamber 14. The regulator 22 may be responsive to either temperature or pressure, or both, as desired. In the event that the pressure or temperature in the chamber becomes excessive, the regulator opens the circuit to the heater 16, thereby disconnecting it from the power circuit. The exact details of the regulator 22 constitute no part of the present invention, and it is to be understood that there are many different types of regulators on the market that are adapted for the service required.

By supplying thermal energy to the heating chamber from a source that is not dependent upon the fuel after having traversed the heating chamber, I am able to provide a supply of vapor fuel in advance of the initial admission of fuel to some connected apparatus. Also, when the demands for fuel increase, the heat available for converting the fuel into a vapor in the heating chamber is not affected by the changes in the conditions of the vapor being generated in the heating chamber. Where a heating chamber depends upon exhaust gases from connected apparatus, or upon a burner supplied with fuel vapor generated therein, difficulty is experienced in initially starting the device, owing to the cold condition of the apparatus and there being no heat available for initially vaporizing any fuel. After the connected apparatus begins to work, the quantity of heat available for heating the heating chamber varies in accordance with the load placed thereon. These difficulties are eliminated by supplying thermal energy to the heating chamber from a source independent of the vaporized fuel.

The rate of output of the heating chamber is controlled by a valve associated with the discharge conduit 18. In Figure 1 a valve 24 is shown in the discharge conduit 18. The valve 24 is connected to the fuel valve 12 by a link 25. Upon the manipulation of the valve 24 to increase or decrease the amount of vapor delivered by the heating chamber, the fuel valve 12 is moved to increase or decrease the supply of liquid fuel to the heating chamber. The valves 24 and 12 normally occupy an intermediate position which is neither full open nor full closed, depending upon the amount of fuel required at any particular time.

In Figures 2 and 3 a slightly different form of control valve is illustrated. The control valve 24ª is constituted by a perforated plate 26 inserted between the casing 14 and the hood 17. The plate is provided with ports 27 through which the vapor escapes from the heating chamber. A disc 28 is mounted for rotation on the upper surface of the plate 26. The disc 28 is provided with openings 29 that cooperate with the openings 27 for permitting the discharge of the vaporized fuel. As the disc 28 is rotated relative to the plate 26, the alined areas of the openings 27 and 28 vary, thereby varying the amount of fuel moving from the heating chamber 14 to the conduit 18. The disc 28 is rotated by a shaft 30 extending upwardly through an opening 31 in the lower wall of the chamber 15, through the chamber 15, through a packing gland 32 in the casing 14 and an opening 35 in the plate 26. The end of the shaft 30 is threaded for the reception of a clamping nut 36 for securing the disc 28 thereto. A collar 37 for the shaft 30 is provided externally of the insulating material 20 at the bottom of the heating device.

For controlling the admission of fuel to the heating chamber in accordance with the operation of the valve 24ª, the shaft 30 is provided with a bevel gear 38 meshing with a bevel gear 39 on the fuel valve 12ª. Upon rotation of the shaft 30 by any suitable means, the effective ports constituted by the alined portions of the openings 27 and 29 are varied.

When the alined portions of the openings are increased, thereby increasing the amount of vapor delivered by the heating chamber, the fuel valve 12ª is automatically opened to increase the amount of liquid delivered to the diaphragm 21. When the disc 28 is rotated to close the ports leading from the heating chamber 14 to the conduit 18, the valve 12ª is likewise closed to reduce the amount of fuel supplied to the heating chamber.

In either modification of the invention the amount of fuel supplied to the heating chamber is controlled in accordance with the output of vapor from the heating chamber in order to prevent the formation of a body of liquid at the bottom of the heating chamber.

Referring to Figure 1, a pressure operated safety device 40 is provided for controlling a valve 41 in the conduit 10 in the event that the pressure in the heating chamber becomes excessive. The device 40 is provided with a diaphragm 42. The upper surface of the diaphragm is connected by a conduit 44 with the heating chamber 14 whereby the pressure above the diaphragm is that of the heating chamber. The lower surface of the diaphragm is connected to the valve 41 through a spring 45 that normally holds the valve open. In the case of excessive pressures, the diaphragm 42 is depressed against the spring 45, thereby closing the valve 41. The outlet conduit 18 may be provided with a heating coil 46 for maintaining the temperature of vapor moving therethrough, if desired.

When the apparatus is first put into use, it is necessary to supply some quantity of liquid fuel to the heater, and, at the same time, keep the control valve closed so that an initial pressure may be built up. A by-pass 47 connects a conduit 10 with the heating chamber 14 independently of the fuel valve 12. The by-pass 47 has a valve 48 therein. This valve is normally closed, but when the apparatus is first put into operation, the valves 12 and 24 are closed and the valve 27 is opened so as to supply liquid to the heating chamber 14 for building up an initial pressure.

Referring to Figure 4, I have illustrated the heat vaporization curve for gasoline as an example of the general behavior of volatile liquids, each of which have a slightly different curve. As the pressure in pounds per square inch on gasoline increases, the number of British thermal units required for converting one pound of gasoline into vapor diminishes. The curve is a smooth curve and nearly approaches a straight line between pressures ranging from below 100 pounds per square inch absolute pressure to approximately 350 pounds per square inch absolute pressure. This curve clearly illustrates the decrease in heat required for vaporizing gasoline with increasing pressure. The curve also illustrates the advantage of maintaining a good supply of heat independent of the fuel traversing the heating chamber in order that a sufficient supply of thermal energy is available to completely evaporate each pound of fuel supplied at the different temperatures. The failure to supply a sufficient amount of heat might result in the accumulation of a body of liquid with the resultant disadvantages of partial vaporization and coking.

While I have illustrated and described certain present preferred embodiments of the invention, it will be understood that the invention may be otherwise embodied and practiced within the scope of the following claims.

I claim:

1. In a method of utilizing liquid fuel, the steps including supplying fuel in liquid form to a heating zone, there supplying sufficient heat to the fuel to vaporize it, taking off vaporized fuel from said zone and supplying additional liquid fuel thereto, while maintaining a pressure in the heating zone sufficient to limit cracking of the liquid fuel.

2. A method of preparing liquid fuel for consumption including the steps of supplying liquid fuel in small quantities to a closed vaporizing chamber having a large free vapor space, supplying sufficient heat to said chamber to vaporize the said fuel substantially immediately and completely, leaving little or no liquid accumulation therein, to create a vapor pressure sufficient to materially reduce the heat of vaporization of liquid fuel subsequently supplied to the chamber against said pressure, continuing the supply of liquid fuel in small quantities to the chamber, and applying heat to said chamber from a source inadequate to vaporize the fuel completely under lower pressures, to convert the liquid into a dry vapor under the pressure existing in said chamber, and supplying the vapor to a consuming device practically as fast as vaporized, substantially without condensation or loss of heat, for combustion.

3. In a method of utilizing liquid fuel, the steps including delivering the fuel in small amounts to a chamber having a large vapor space, supplying sufficient heat to said chamber to vaporize the liquid substantially immediately and completely, leaving little or no liquid accumulation therein, and establish a vapor pressure in the chamber substantially in excess of that of the atmosphere and sufficient to reduce the heat of vaporization of said fuel materially, supplying additional fuel and heat to the chamber at rates so related as to maintain such pressure whereby coking of the fuel in the chamber is minimized and the liquid is converted into a dry vapor, and supplying such vapor to a consuming device substantially immediately and without substantial condensation or loss of heat, for combustion.

4. In a method of utilizing liquid fuel, the steps including initially supplying the fuel in relatively small amounts to a closed, thermally insulated chamber, applying a sufficient amount of heat to the chamber to vaporize the fuel substantially immediately and completely, leaving little or no accumulation of liquid therein, to create a vapor pressure in the chamber sufficient to limit cracking of the fuel and reduce substantially the heat of vaporization, continuing the supply of fuel in small amounts to the chamber and the application of heat thereto, and conducting the resulting vapor substantially immediately to a consuming device without substantial condensation or loss of heat, for combustion.

5. In a method of utilizing liquid fuel, the steps including supplying it in small quantities to a closed chamber, heating said fuel to vaporize it substantially immediately and completely, leaving little or no liquid remaining in the chamber, to build up a vapor pressure in the chamber whereby the heat of vaporization of fuel subsequently supplied thereto is materially reduced, supplying additional liquid fuel against said pressure in small quantities, heating the additional liquid fuel to maintain said vapor pressure, and conducting the vapor under its own pressure to a consuming device without substantial condensation or loss of heat, for combustion.

6. A method of utilizing liquid fuel which includes the steps of delivering it in small quantities to a chamber under pressure, supplying heat to said chamber sufficient completely to vaporize the liquid fuel substantially immediately, leaving little or no accumulation of liquid in the chamber, and produce a vapor pressure in the chamber of a value to reduce substantially the heat of vaporization, and conducting the vapor under its own pressure to a consumption device without substantial condensation or loss of heat, for combustion.

ARTHUR H. MASTERS.